May 14, 1929. S. RUBIN 1,713,483
AUTOMOBILE SAFETY APPARATUS
Filed July 30, 1928  2 Sheets-Sheet 1
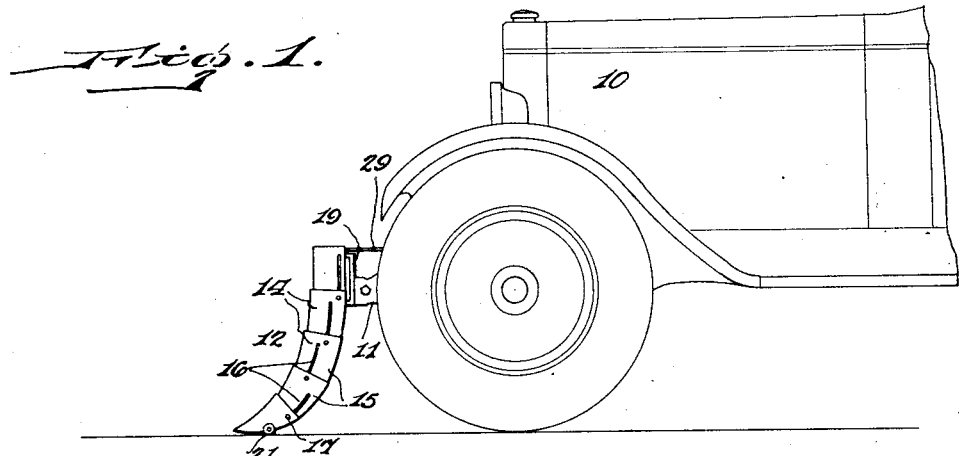
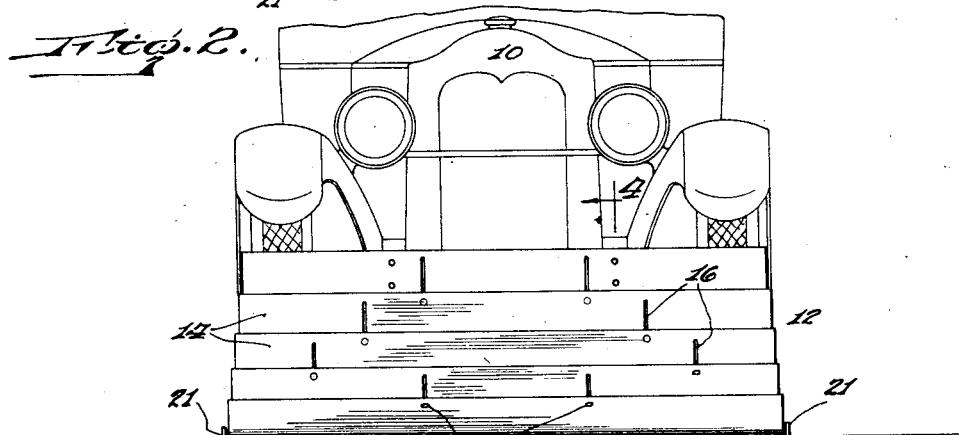
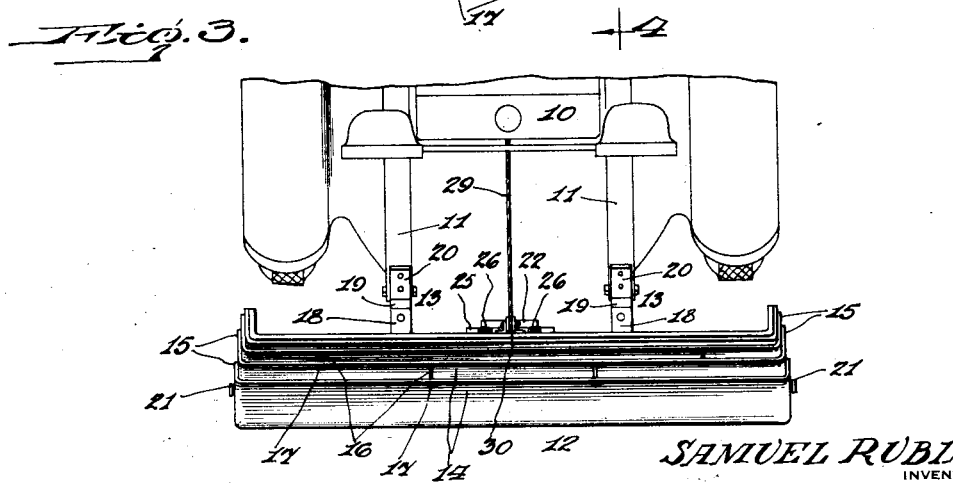
SAMUEL RUBIN,
INVENTOR
BY *Victor J. Evans*
ATTORNEY
WITNESS:

May 14, 1929.  S. RUBIN  1,713,483
AUTOMOBILE SAFETY APPARATUS
Filed July 30, 1928   2 Sheets-Sheet 2
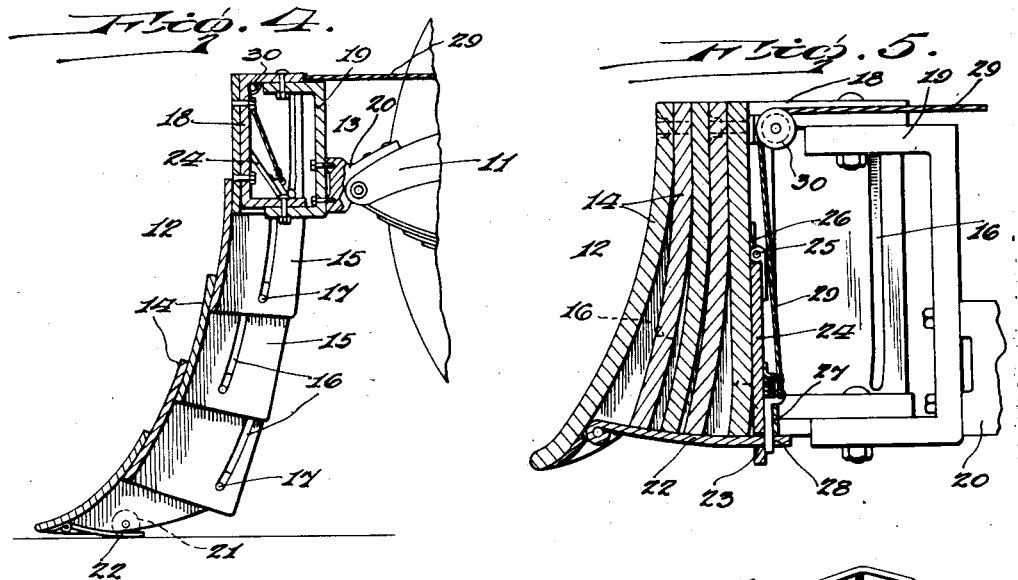
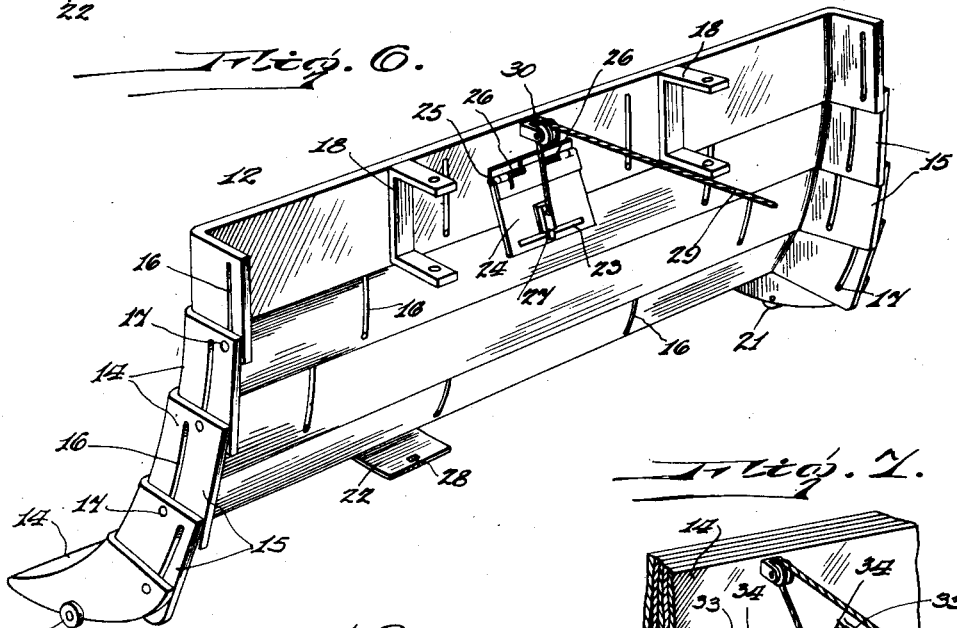
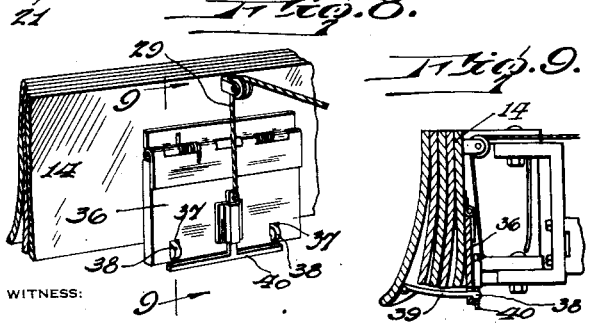
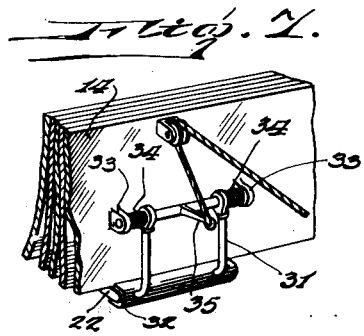
SAMUEL RUBIN
INVENTOR
BY Victor J. Evans
ATTORNEY Patented May 14, 1929.

1,713,483

UNITED STATES PATENT OFFICE.

SAMUEL RUBIN, OF BROOKLYN, NEW YORK.

AUTOMOBILE SAFETY APPARATUS.

Application filed July 30, 1928. Serial No. 296,138.

This invention relates to improvements in automobile safety apparatus and has particular reference to a combined bumper and fender therefor.

The primary object of the invention resides in a fender fixedly mounted on the front of an automobile which is foldable in a compact manner to normally serve as a bumper, but which may be manually released by an operator in case of emergency to drop to an obstructing position forward of the front wheels to prevent serious injury to a person struck thereby.

Another object of the invention is to provide a combination bumper and fender which includes a plurality of slidable plates movable to a folded or raised position one over the other, and which are held by suitable releasable means for automatic dropping by gravity upon actuation of the same, to an extended position in close proximity to the ground.

A further object is the provision of a combined bumper and fender which may be mounted upon an automobile without detracting from the artistic appearance thereof.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of the front end of an automobile with my safety apparatus in position thereon showing the same in position as a fender.

Figure 2 is a front elevation thereof.

Figure 3 is a top plan view.

Figure 4 is an enlarged vertical sectional view on the line 4—4 of Figure 2.

Figure 5 is a similar view but showing the device for use as a bumper.

Figure 6 is a perspective view of the apparatus per se.

Figure 7 is a perspective view of a modified form of holding and releasing means.

Figure 8 is a further modified form of holding and releasing means.

Figure 9 is a vertical transverse sectional view on the line 9—9 of Figure 8.

Referring to the drawings my reference characters, the numeral 10 designates the front end of an automobile, and 11 the front ends of the chassis to which my improved safety apparatus 12 is mounted by suitable attaching means 13.

The safety apparatus includes a plurality of resilient elongated plate sections 14 having their ends bent inwardly at right angle to provide sides 15. The longitudinal front walls are curved transversely to provide a scoop or dished fender when the plates are in a lowered position as shown in Figures 1, 4 and 6 of the drawings. The plate sections are arranged to lie one over the other and are slidably connected together by slots 16 provided in the front and sides thereof to receive respective pins 17 carried by the next adjacent plate section. The opposite ends of the slots act as stops for the pins for limiting movement of the plate sections to folded and extended positions.

The innermost plate section 14 is fixedly mounted to the chassis by the attaching means which embodies U-shaped brackets 18 bolted to the innermost plate section and which fit over U-shape brackets 19 to which they are bolted. The brackets 19 are carried by brackets 20 mounted on the chassis. By reason of the innermost plate section being fixedly mounted, the other sections are free to drop by gravity to an extended position, the outermost plate terminating short of the ground when in a lowered position and being supported against accidental contact therewith by rollers 21 carried thereby.

It will be appreciated that the sliding plate sections may be raised to a position whereupon they are disposed on the same general horizontal plane in a nested position, at which time the apparatus serves as a bumper, and for releasably holding the same in such position, I provide a pivoted tongue or bridge 22 on the outermost plate section. The tongue is swung to a position to underlie the other plates and has its free end extending through an elongated slot 23 in a plate 24 hingedly connected to the inner face of the innermost plate section as at 25. Springs 26 are embodied in the hinge joint 25 and tend to swing the plate away from the plate section but which is held thereagainst by a spring actuated latch bolt 27 extending through a slot 28 in the protruding portion of the tongue. A cable 29 has one of its ends connected to the latch bolt and its other end passed over a pulley 30 and lead to a position within reach of the driver, for instant manipulation in an emergency.

In practice and under ordinary running conditions, the fender is collapsed into the position shown in Figure 5 of the drawings, at which time the same acts as a resilient bumper for the automobile, but in emergency, when it appears that a person may be struck by the vehicle, the operator manually pulls upon the cable 29, which retracts the spring latch bolt 27, releasing the plate 24 from its flat position against the supporting plate section. As the springs 26 swing the plate 24 outwardly, the tongue 22 is released therefrom, whereupon the unfixed plate sections 14 drop by gravity to an extended position in close proximity to the ground, which forms a scoop for preventing the person hit from being run over by the wheels of the vehicle and seriously injured thereby.

In Figure 7, I have shown a slightly modified form of releasing mechanism wherein a frame 31 having tongue receiving portions 32 is swingingly mounted in bearings 33 on the innermost plate section 14. Springs 34 act upon the frame to normally hold the frame in locking position for supporting the tongue 22 which seats in the tongue receiving portion 32. An arm 35 extends from the frame and has one end of the pull cable connected thereto, whereupon a pull on the cable will swing the frame outwardly and release the tongue to permit the plate sections to drop to extended position.

In Figures 8 and 9, I have shown a further modification wherein a spring actuated hinged plate 36 somewhat similar to the plate 24 is provided but which differs therefrom by having slots 37 therein for the passage of hooks 38 formed on the free ends of the pivoted tongue 39 which lock with the walls of the slots. A spring actuated T-shaped bolt 40 is carried by the plate 36 and is pulled up into engagement with the ends of the hooks 38 by the manipulating cable 29. When the T-shape bolt is pulled up, the same strikes the projecting ends of the hooks and releases them from locking engagement with the walls of the slots 37, whereupon the spring actuated plate 36 swings outward and allows the tongue and plate sections to drop by gravity.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a safety apparatus for motor vehicles, a fender comprising a plurality of plate sections slidably connected together for folding to a position one over the other and for extension one beyond the other by gravity, and releasable means for supporting said plate sections in folded position.

2. In a safety apparatus for motor vehicles, a fender comprising a plurality of elongated plate sections slidable one over the other, means for limiting sliding of said elongated plate sections in opposite directions for movement to a raised or folded position side by side and to lowered or extended position one beyond the other, and releasable holding means for supporting said plate sections in folded position.

3. In a safety apparatus for motor vehicles, a fender comprising a plurality of elongated plate sections slidable one over the other, means for limiting sliding of said elongated plate sections in opposite directions for movement to a raised or folded position side by side and to lowered or extended position one beyond the other, and releasable holding means for supporting said plate sections in folded position, said releasable holding means including a pivoted tongue carried by one of said plate sections and underlying the other plate sections, and manually actuated catch mechanism for holding said tongue in such position.

4. A safety fender for automobiles comprising a plurality of elongated plate sections slidable one over the other, the innermost of said plate sections adapted to be fixedly connected to the front of an automobile, means for limiting the extension of said plate sections one beyond the other, said plate sections co-acting to provide a solid wall structure and being slidable to a folded position side by side, a tongue pivoted to the outermost plate section for underlying the other of said plate sections to support the intermediate plate sections in a folded position, and manually controlled catch means carried by the innermost fixed plate section for holding said tongue in a locked position.

5. A safety fender for automobiles comprising a plurality of nested plate sections slidably connected together, each plate section being connected with the next adjacent section by a pin and slot arrangement, the innermost section adapted to be fixedly connected to the front of an automobile to allow the other sections to drop by gravity to an extended position in close proximity to the ground.

6. A safety fender for automobiles comprising a plurality of nested plate sections slidably connected together, each plate section being connected with the next adjacent section by a pin and slot arrangement, the innermost section adapted to be fixedly connected to the front of an automobile to allow the other sections to drop by gravity to an extended position in close proximity to the ground, and releasable means for supporting said plate sections in a raised nested position.

7. A fender comprising a plurality of plate sections arranged in overlapping position, one of said plate sections adapted to be fixedly secured to the front of a motor vehicle, while the others are connected one with the other.

8. In a fender for automobiles, a plurality of overlapping plate sections having their ends bent inwardly and nested one within the other.

9. A fender comprising a plurality of plate sections arranged in overlapping position, one of said plate sections adapted to be fixedly secured to the front of a motor vehicle, while the others are connected one with the other, and rollers carried by one of said plate sections for engagement with the ground.

10. In a fender for automobiles, a plurality of overlapping plate sections nested one within the other.

In testimony whereof I have affixed my signature.

SAMUEL RUBIN.